United States Patent
Hajduczenia

(10) Patent No.: US 12,273,142 B2
(45) Date of Patent: Apr. 8, 2025

(54) POWER SAVING FOR MULTI-WAVELENGTH PASSIVE OPTICAL NETWORK (PON)

(71) Applicant: Charter Communications Operating, LLC, St. Louis, MO (US)

(72) Inventor: Marek Hajduczenia, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/395,101

(22) Filed: Aug. 5, 2021

(65) Prior Publication Data
US 2023/0040541 A1    Feb. 9, 2023

(51) Int. Cl.
*H04B 10/077* (2013.01)
*H04J 14/02* (2006.01)

(52) U.S. Cl.
CPC ........ *H04B 10/077* (2013.01); *H04J 14/0245* (2013.01); *H04J 14/0249* (2013.01)

(58) Field of Classification Search
None
See application file for complete search history.

(56) References Cited

U.S. PATENT DOCUMENTS

| | | | | |
|---|---|---|---|---|
| 7,409,164 B2* | 8/2008 | Seo | ........................ | H04J 3/0682 398/137 |
| 8,000,602 B2* | 8/2011 | Haran | ................ | H04Q 11/0067 398/67 |
| 8,254,780 B2* | 8/2012 | Mizutani | ............ | H04Q 11/0067 398/24 |
| 8,467,677 B2* | 6/2013 | Straub | .................... | H04B 10/27 398/20 |
| 8,705,965 B2* | 4/2014 | Sugawa | ............. | H04Q 11/0067 398/67 |
| 8,781,326 B2* | 7/2014 | Hu | ....................... | H04L 27/2697 398/140 |
| 8,879,594 B2* | 11/2014 | Dvir | ..................... | H04B 10/564 372/38.1 |

(Continued)

OTHER PUBLICATIONS

International Search Report and Written Opinion of the International Searching Authority received from the European Patent Office in corresponding Application No. PCT/US2022/037932 dated Nov. 11, 2022.

(Continued)

*Primary Examiner* — Jai M Lee
(74) *Attorney, Agent, or Firm* — THE MARBURY LAW GROUP, PLLC

(57) ABSTRACT

Methods and systems for reducing power consumption in a multi-channel passive optical network (PON). A processor in the PON may monitor the channels in the multi-channel PON to detect a currently inactive channel, determine whether the detected channel has been inactive for an extended period of time, and deactivate the detected channel (by deenergizing transmitter(s) and/or receiver(s) associated with the detected channel) in response to determining that the channel has remained inactive for an extended period of time. The processor may re-activate the channel in response to determining that an optical signal has been reliably present on the channel for a sufficient period of time.

30 Claims, 9 Drawing Sheets

(56) References Cited

U.S. PATENT DOCUMENTS

| | | | | |
|---|---|---|---|---|
| 8,879,912 B2* | 11/2014 | Kozaki | H04L 47/781 | |
| | | | 398/58 | |
| 8,886,041 B2* | 11/2014 | Tanaka | H04L 12/413 | |
| | | | 398/58 | |
| 8,913,890 B2* | 12/2014 | Gao | H04Q 11/0067 | |
| | | | 725/111 | |
| 9,084,034 B2* | 7/2015 | Zhang | H04B 10/272 | |
| 9,106,984 B2* | 8/2015 | Mukai | H04L 12/40013 | |
| 9,113,237 B2* | 8/2015 | Boyd | H04Q 11/0067 | |
| 9,240,854 B2* | 1/2016 | Mukai | H04J 14/0267 | |
| 9,270,406 B2* | 2/2016 | Hirano | H04Q 11/0067 | |
| 9,432,755 B2* | 8/2016 | Luo | H04Q 11/0067 | |
| 9,560,428 B2* | 1/2017 | Yan | H04J 14/025 | |
| 9,584,249 B2* | 2/2017 | Furusawa | H04J 14/0246 | |
| 9,596,046 B2* | 3/2017 | Kubo | H04L 12/12 | |
| 2005/0262545 A1* | 11/2005 | Masuda | H04B 10/27 | |
| | | | 398/67 | |
| 2012/0033963 A1* | 2/2012 | Nose | H04L 12/2898 | |
| | | | 398/1 | |
| 2013/0034356 A1* | 2/2013 | Luo | H04J 14/025 | |
| | | | 398/72 | |
| 2013/0294775 A1* | 11/2013 | Hirth | H04Q 11/0067 | |
| | | | 398/67 | |
| 2013/0315587 A1* | 11/2013 | Mukai | H04J 14/0247 | |
| | | | 398/45 | |
| 2014/0233940 A1* | 8/2014 | Pitzer | H04B 10/272 | |
| | | | 398/8 | |
| 2015/0037035 A1* | 2/2015 | Sugawa | H04J 14/0282 | |
| | | | 398/66 | |
| 2015/0055957 A1* | 2/2015 | Lee | H04J 14/0227 | |
| | | | 398/79 | |
| 2015/0124313 A1* | 5/2015 | Takahashi | H01S 3/1301 | |
| | | | 359/344 | |
| 2015/0125156 A1* | 5/2015 | Huang | H04J 14/0282 | |
| | | | 398/118 | |
| 2017/0126350 A1* | 5/2017 | Gao | H04Q 11/0067 | |
| 2017/0294982 A1 | 10/2017 | Wu et al. | | |
| 2018/0139006 A1 | 5/2018 | Zhao et al. | | |
| 2021/0409125 A1* | 12/2021 | Wey | H04B 10/80 | |

OTHER PUBLICATIONS

2nd Written Opinion of the International Preliminary Examining Authority received from the European Patent Office in corresponding International Application No. PCT/US2022/037932 dated Mar. 13, 2023.

International Preliminary Report on Patentability received from the European Patent Office in related International Application No. PCT/US2022/037932 mailed Nov. 3, 2023.

* cited by examiner

POWER SAVING FOR MULTI-WAVELENGTH PASSIVE OPTICAL NETWORK (PON)

BACKGROUND

A passive optical network (PON) is a fiber-optic telecommunications technology for delivering broadband network access to end-customers. PON architecture may include a point-to-multipoint topology in which a single optical fiber serves multiple endpoints by using unpowered (passive) fiber optic splitters to divide the fiber bandwidth among multiple access points. Passive optical networks are often referred to as the "last mile" between an Internet service provider (ISP) and its customers.

To sustain the increased bandwidth demand of emerging applications in the ISP access network, it is expected that next generation optical access networks will adopt wavelength division/time division multiplexing (WDM/TDM) techniques and technologies to increase PONs bandwidth and capacity. Compared with traditional PONs, the architecture of a WDM/TDM-PON may require more transceivers/receivers. As such, WDM/TDM-PON techniques and technologies may consume more energy than traditional TDM PONs. For example, the latest 25/50G version of Ethernet Passive Optical Network (EPON) defines a multi-wavelength operation scheme in which multiple 25 Gbps wavelength channels may be combined together to form larger capacity transmission channel. This increased capacity allows for increased data rates (aggregate and line rates, etc.), which may in turn increase power consumption of the telecommunication systems. As such, new and improved systems and methods for power saving in multi-wavelength PONs will be beneficial for telecommunication systems, service/network providers and consumers of their services.

SUMMARY

The various aspects include methods of reducing power consumption in a multi-channel passive optical network (PON), including monitoring individual channels in the multi-channel PON to detect a currently inactive channel, determining whether the detected inactive channel has remained inactive for an extended period of time, and deactivating the detected inactive channel by deenergizing a transmitter or receiver associated with the detected inactive channel in response to determining that the detected inactive channel has remained inactive for an extended period of time.

In some aspects, the method may include periodically probing the deactivated channel to determine whether an optical signal is reliably present on the deactivated channel, and reactivating the channel by reenergizing the transmitter or receiver associated with the inactive channel in response to determining that the optical signal has been reliably present on the deactivated channel. In an aspect, periodically probing the deactivated channel to determine whether the optical signal is reliably present on the deactivated channel may include determining a ratio between a number of probes within a time period that detected a presence of the signal and a total number of probes within that time period, determining whether the determined ratio exceeds a threshold value, and determining that the optical signal has been reliably present on the deactivated channel in response to determining that the determined ratio exceeds the threshold value.

In some aspects, monitoring channels in the multi-channel PON to detect the currently inactive channel may include using narrow-band spectral power measurements or clock recovery techniques to determine whether the channel is currently inactive. In an aspect, monitoring channels in the multi-channel PON to detect the currently inactive channel may include determining whether the channel includes a transmission envelope. In an aspect, determining whether the channel has remained inactive for an extended period of time may include setting a timer that increments a time value in response to detecting the currently inactive channel, and continuing to monitor the detected channel to determine whether the channel remains inactive, determining whether the time value exceeds a threshold value, and determining that the channel has remained inactive for an extended period of time in response to determining that the time value exceeds the threshold value. In some aspects, determining whether the channel has remained inactive for an extended period of time may include periodically probing a status of the channel to determine whether the channel has remained inactive.

In some aspects, the method may include communicating a power saving state between an optical line terminal (OLT) of the PON and an optical network unit (ONU) of the PON via a previously established control channel. In some aspects, communicating the power saving state between the OLT of the PON and the ONU of the PON via the previously established control channel may include communicating the power saving state between the OLT of the PON and the ONU of the PON via an Operations, Administration and Management (OAM) channel or a medium access control (MAC) control channel (MCC). In an aspect, communicating the power saving state between the OLT of the PON and the ONU of the PON via the OAM or MCC further includes the ONU using the OAM or MCC to signal the OLT that it can enter a power saving mode.

In some aspects, the method may include determining, by an optical line terminal (OLT) of the PON, whether to disable a specific wavelength channel as a central network controller, and communicating a termination decision to all subtended optical network unit (ONUs) of the PON via a dedicated wavelength channel management protocol in response to the OLT determining to disable the specific wavelength channel as the central network controller.

Further aspects may include a computing device having a processor configured with processor-executable instructions to perform various operations corresponding to the methods discussed above.

Further aspects may include a computing device having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate example embodiments of the invention, and, together with the general description given above and the detailed description given below, serve to explain features of the invention.

DETAILED DESCRIPTION

Figure 1:
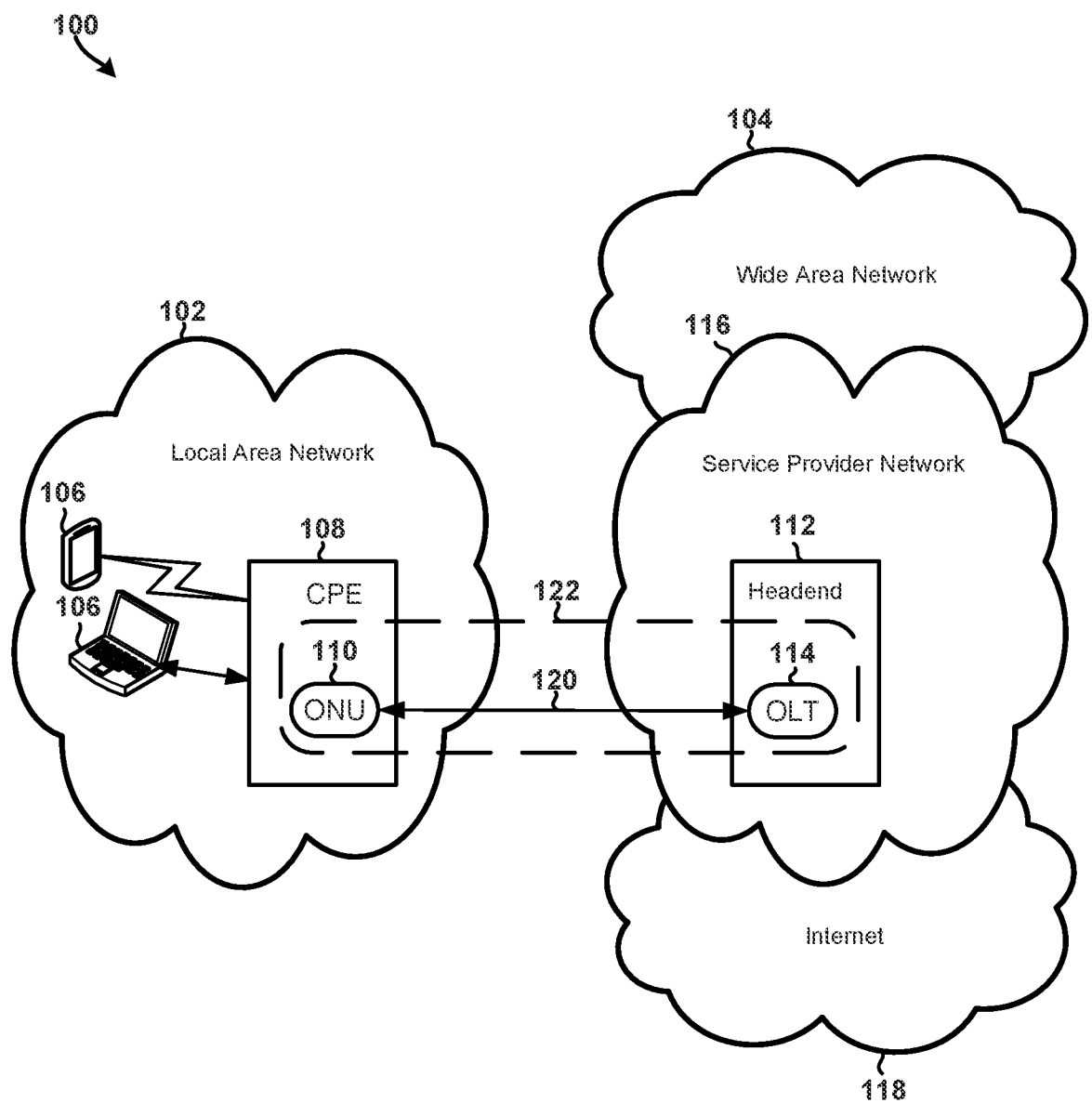
FIG. 1 is a system block diagram illustrating network components in an example communication system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, the embodiments include methods, and components configured to implement the methods, for reducing power consumption in a multi-channel wave division multiplexing (WDM) and/or time division multiplexing (TDM) passive optical network (PON). In some embodiments, one or more components in the WDM/TDM PON, such as an optical line terminal (OLT) and/or an optical network unit (ONU), may be configured to monitor individual channels in the multi-channel PON to detect a currently inactive channel, determine whether the detected inactive channel has remained inactive for an extended period of time, and deactivate the detected inactive channel by deenergizing a transmitter or receiver associated with the detected inactive channel in response to determining that the detected inactive channel has remained inactive for an extended period of time.

These and other operations disclosed in this application may allow for selectively disabling wavelength channels and their associated optical network unit (ONU) resources in the WDM/TDM PON to significantly improve the efficiency, performance, and power consumption characteristics of the ONU device(s). These embodiments may also improve the efficiency, performance, and power consumption characteristics of the optical line terminal (OLT) device and/or of the PON. Further, by improving the characteristics of the ONU, OLT and/or PON, the embodiments may improve the performance and functioning of the user equipment (UE) devise that use the PON to send or receive information.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC also may include any number of general purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. SoCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard, in a single UE, or a single CPE device. The proximity of the SoCs facilitates high speed communications and the sharing of memory and resources.

The term "multicore processor" may be used herein to refer to a single integrated circuit (IC) chip or chip package that contains two or more independent processing cores (e.g., CPU core, graphics processor unit (GPU) core, etc.) configured to read and execute program instructions. A SoC may include multiple multicore processors, and each processor in an SoC may be referred to as a core. The term "multiprocessor" may be used herein to refer to a system or device that includes two or more processing units configured to read and execute program instructions.

The term "customer premise equipment (CPE)" may be used herein to refer to one or more devices or components that allow customers or subscribers of a service provider network connect their user equipment (UE) devices to the Internet. A CPE device may include a cable modem, digital subscriber line modem, optical network unit (ONU), router, switch, firewall, packet filter, wireless access point, and/or a residential gateway that provide network connectivity to home or small office network. For example, CPE may include a modem that operates as a network bridge that provides bi-directional data communication via radio frequency channels on a hybrid fiber-coaxial (HFC) and/or radio frequency over glass (RFoG) infrastructure. Alternatively, or in addition, the CPE may include an ONU, which is sometimes called an optical network terminal (ONT).

The terms "optical network unit (ONU)" and "optical network terminal (ONT)" may be used interchangeably herein to refer to a device, SIP, SOC, chip, component, system, or sub-system that provides, facilitates, or allows bi-directional data communications between the CPE and components in the service provider network. An ONU may include various ONU resources, such as receivers, transmitters, processors, application-specific integrated circuits (ASICs), software, firmware, memory subsystems, and other similar computing components, resources, systems, or subsystems. During normal operation, these ONU resources may consume a significant amount of processing, memory or energy resources, as well as other often scare or limited resources.

Examples of ONUs include an asynchronous transfer mode passive optical network (APON), a broadband passive optical network (BPON), an Ethernet passive optical network (EPON), a Gigabit EPON (GE-PON), and a Gigabit passive optical network (GPON). For ease of reference and to focus the discussion of the relevant features, some of the embodiments below are discussed using EPON architectures as defined in IEEE Std 802.3ca-2020. However, it should be understood that the various embodiments could include, use or benefit from any or all of the ONU techniques, technologies, or architectures that are known in the art and/or discussed in this application. As such, nothing in this application should be used to limit the claims EPON or EPON-related technologies unless expressly recited as such in the claims.

The term "passive optical network (PON)" may be used herein to refer to an ONU, an optical line terminal (OLT), or any combination thereof. Generally, the combination of an ONU at the customer premise site and an OLT in the service provider network form a PON. A PON may function logically as a single network element (NE) that allows for bi-directional data communications between components at a customer premise site (e.g., a CPE in a home or small office network) and components in the service provider network, and ultimately the Internet. A PON may include (or connect) multiple ONUs and a single OLT.

The term "upstream" is used herein to refer to data, communications, transmissions, etc. that are sent from an ONU to an OLT in a PON. The term "downstream" is used herein to refer to data, communications, transmissions, broadcasts, etc. that are sent from an OLT to an ONU. The term "broadcast" is used herein to mean the transmission of data (e.g., data streams, files, messages, information packets, etc.) so that it can be received by a large number of receiving devices simultaneously, and encompasses unicast, multicast and other transmission technologies suitable for sending information to one or many receiver devices in a single transmission.

FIG. 1 is a simplified block diagram that provides an example of a network 100 that may be used to implement the various embodiments. In the example illustrated in FIG. 1, the network 100 includes a local area network (LAN) 102 and a wide area network (WAN) 104. The LAN 102 may be a home or small office network that includes user equipment (UE) 106 devices (e.g., laptop, mobile phone) coupled to a field-deployed customer premise equipment (CPE) 108 device via wired and/or wireless communication links. The CPE 108 may include an optical network unit (ONU) 110, and communication links 120 to a service provider network 116 within the WAN 104 that allow the UE 106 devices to send and receive information to and from the Internet 118.

The service provider network 116 may include various network components for providing consumers with access to the Internet 118 or Internet protocol (IP) services over broadband connections. For example, the service provider network 116 may include a hubsite, fiber node, or headend 112 that includes an optical line terminal (OLT) 114 that may be configured to facilitate high speed communications between the CPE 108 and the components within the service provider network 112. The OLT 114 may include various OLT components, such as interface units, a network element (NE) controller, a switch fabric for data services, a fabric or multiplexer for the voice channels, etc.

The ONU 110 and OLT 114 devices may collectively form a passive optical network (PON) 122. The PON 122 may function logically as a single network element (NE) that allows for bi-directional data communications 120 between the components in the LAN 102 (e.g., CPE 108, etc.) and the components in the WAN 104 (e.g., headend 112, etc.).

The PON 122 (i.e., the OLT 114 and/or ONU 110) may be configured to use medium access control (MAC) protocols and/or any or all of a variety of well-known technologies and techniques, including time division multiplexing (TDM), time domain multiple access (TDMA), and wave division multiplexing (WDM).

In various embodiments, the PON 122 may implement TDM and/or WDM technologies for upstream and/or downstream communications. For example, in a TDM downstream implementation, the OLT 114 may broadcast a signal that is received by all of the ONUs 110 in the PON 122 and/or by all of the ONUs that may be included in same market, city or geographical area as the headend 112. The broadcast signal may include the downstream data for any or all of the ONUs 110 associated with the headend 112. The broadcast signal may also include synchronization information (e.g., for the upstream transmissions, etc.) and/or operations, administration, maintenance, and provisioning (OAM&P) overhead information. Each ONU 110 may receive, identify and extract from the broadcast signal only the data that is directed to it (e.g., by using the time slots, cell/packet frame address information, etc.). For upstream communications, the ONU 110 may be granted a time slot and/or pre-assigned a fixed portion of an upstream bandwidth channel in which it may transmit data (in its granted time slot, at the appropriate time, etc.).

The PON 122 may also implement WDM technologies for the upstream and/or downstream communications. In a WDM implementation, the PON 122 may use separate bands for the upstream and downstream communications. For example, the PON 122 may use the 1480-1500 nm band for downstream communications, and the 1260-1360 nm band for upstream communications. Alternatively or in addition, the PON 122 may use separate wavelength channels for each ONU 110 to accomplish one-on-one or point-to-point communications between the OLT 114 and each of the ONUs 110. To accomplish this, each ONU 110 may be equipped with an optical filter that identifies and selects the specific wavelength channels on which it is to receive data. Similarly, the OLT 114 may be equipped with a plurality of optical filters, one for each of the ONUs 110 in the PON 122. The OLT 114 may select the wavelength(s) on which it is to transmit data based on the results generated by the optical filter associated with its target ONU 110.

In recent years, governmental organizations have begun implementing various policies to promote energy efficiency and reduce power consumption on telecommunication devices (e.g., to combat global climate change, etc.). More recently, these organizations have started scrutinizing the power consumption characteristics of ONU devices. Further, since ONUs are typically deployed at a subscriber premise (e.g., in a CPE, etc.) and powered from subscriber premise power feed, their energy efficiency and power consumption characteristics are important to consumers. For these and other reasons, it is becoming increasingly important to implement effective power saving schemes and/or to otherwise improve the efficiency, performance, and power consumption characteristics of ONU devices.

Previously, various power saving schemes have been proposed to reduce the power draw of ONU devices. Most of these solutions focus on the TDM plane of WDM/TDM PON operations. One such TDM solution is to modify a data scheduling algorithm of the ONU to prioritize overall energy consumption, such as by transmitting data bursts only when absolutely necessary. Another TDM solution is to implement power saving mechanisms at hardware level for use during periods low utilization (e.g., at night, etc.). Examples of such hardware level power saving mechanisms include decreasing processor and/or memory clock rates, periodically shutting down laser transmitter and/or receiver, using processor brownout states, etc.

Due to the nature of WDM/TDM PON systems, existing and conventional solutions do not focus on the WDM plane of operation (e.g., the transmission of data streams across multiple wavelength channels, etc.). For example, in contrast to other systems, wavelength channels in a WDM/TDM PON cannot simply be shut down or disabled during periods of low utilization to reduce power consumption. This is because each wavelength channel in a WDM/TDM PON carries a complete data stream. As such, disabling or shutting down the wavelength channel at any point could result in the complete loss of connectivity and/or may otherwise degrade the user experience.

Typically, during normal or standard operation, there may be enough data to require allocation of resources across all of the available wavelength channels. Under such conditions, all of the wavelength channels remain active and the ONU components (e.g., receiver, transmitter, etc.) continue to operate and consume power at their normal rates. However, there are periods of lowered data demand (e.g., at night, etc.) in which the amount of data that is transmitted and received decreases substantially. During such periods, one or more of the wavelength channels may become and remain idle for a significant amount of time. Yet, despite being idle, the wavelength channels cannot be shut down or disabled without risking a complete loss of connectivity or other conditions that degrade the user experience. Therefore, despite the reduction in demand, existing and conventional solutions simply allow the ONU components to continue operating as per normal, thereby consuming a significant amount of the energy, memory, and/or processing resources of the ONU device.

In a standard single channel TDM PON implementation, the ONU may attempt to improve its overall efficiency and reduce its energy consumption by invoking an energy-consumption-aware scheduling algorithm during the times of lowered data demand. The scheduling algorithm may increase the polling interval and/or otherwise allow the ONU components to be browned out, clocked down, etc. While such operations may reduce the amount of energy consumed by the ONU, the reduction in energy consumption is typically not sufficient or substantial enough to satisfy the consumer or governmental organizations. In addition, the data rates in a single channel TDM PON may be substantially lower than in a multi-channel WDM/TDM PON. Therefore, despite the improvements in energy consumption provided by the above-described solutions, consumers may forgo using single channel TDM PON systems in favor of the higher data rates and/or faster communications provided by multi-channel WDM/TDM PON systems.

The various embodiments include or provide a multi-channel WDM/TDM PON that is configured to selectively disable wavelength channels (e.g., channels 202-208) and their associated ONU resources to significantly improve the efficiency, performance, and power consumption characteristics of the ONU device. For the same or similar reasons, the various embodiments may also improve the efficiency, performance, and power consumption characteristics of the OLT device and/or PON.

Figure 2:
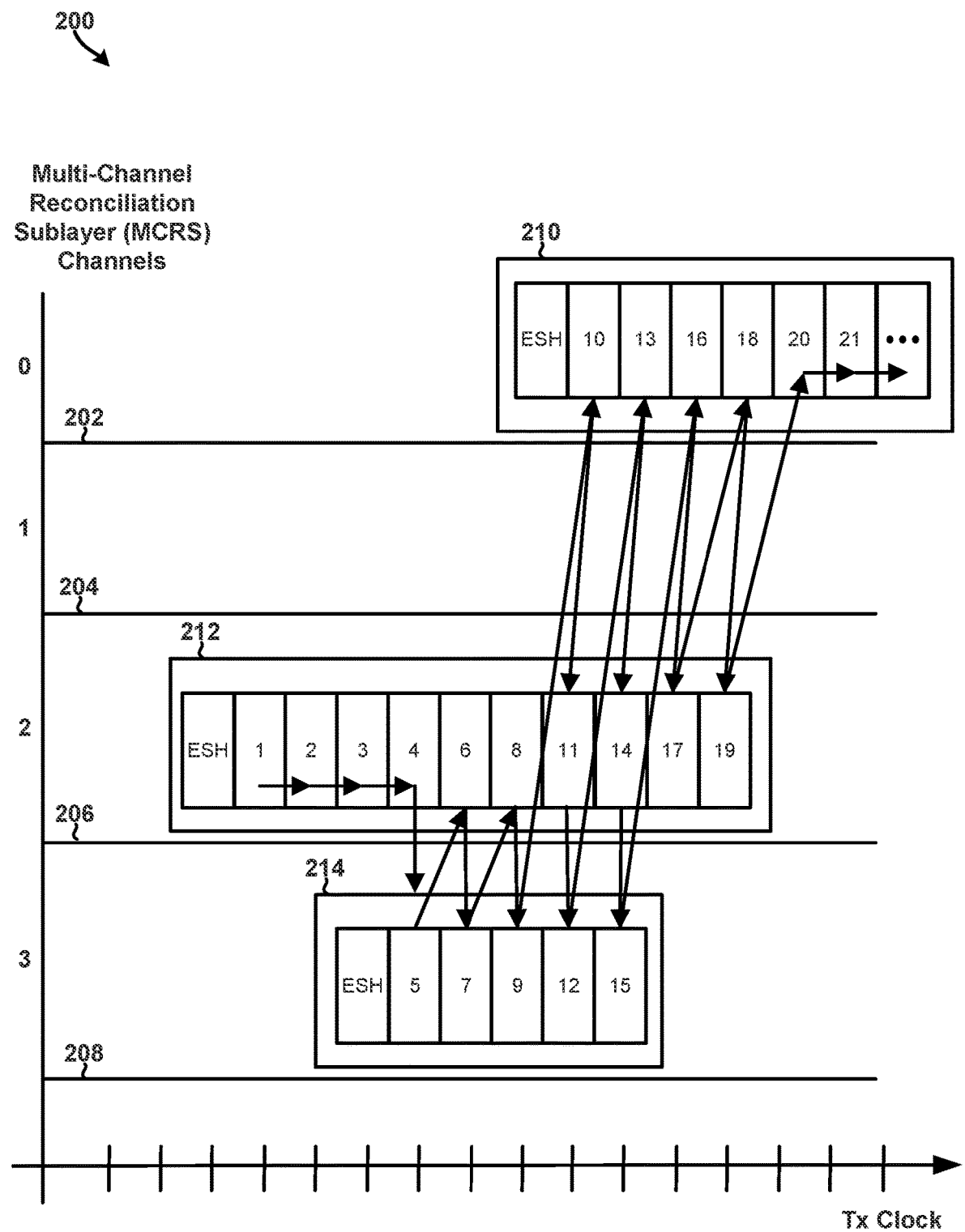
FIG. 2 is a block diagram illustrating a transmission scheme in a passive optical network (PON) in which a single data stream is striped across multiple wavelength channels in a sequential manner in accordance with some embodiments.

FIG. 2 illustrates a WDM/TDM PON system 200 that implements a transmission scheme in which a single data stream is striped across multiple wavelength channels in a sequential manner in accordance with various embodiments. In the example illustrated in FIG. 2, the WDM/TDM PON system 200 includes four multi-channel reconciliation sublayer (MCRS) wavelength channels 202-208 (which are also numbered as channels 0-3). Each individual channel 202-208 may be granted transmission envelopes 210, 212, 214 at arbitrary times and filled in with data as it becomes available. Each transmission envelope 210, 212, 214 may include an envelope start header (ESH) and various data packets (numbered sequentially from 1 to 21 in the example illustrated in FIG. 2). For overlapping transmission envelopes 210, 212, 214, the data may be striped across the channels 202-208 in a sequential manner.

In the example illustrated in FIG. 2, the channels 202, 206 and 208 may be used for active data transmission while channel 204 remains inactive or idle without a transmission envelope. In instances in which the channel 204 remains inactive for an extended period of time, the WDM/TDM PON system 200 may power down the ONU/OLT transmitters/receivers for that channel 204. For example, the WDM/TDM PON system 200 may be configured to monitor the channels 202-208 to detect activity or inactivity (e.g., determine whether they include a transmission envelope, etc.), set a timer that increments a time value in response to detecting that channel 204 does not include a transmission envelope or has otherwise become inactive, periodically probe the status of the channel to determine whether the channel is still absent, compare the timer or time value to a threshold value to generate a comparison result, and determine whether the channel 204 has been inactive for an extended period of time based on the comparison result (e.g., based on whether the time value exceeds the threshold value, etc.). In response to determining that the channel 204 has been inactive for an extended period of time, the WDM/TDM PON system 200 may deenergize or power down the ONU transmitters and/or receivers associated with the channel 204. The WDM/TDM PON system 200 may periodically probe the inactive channel 204 to detect an optical signal, and determine whether the optical signal has been reliably present on that channel 204 for a period of time. In response to determining that the optical signal has been present reliably on the channel 204 for a suitable amount of time, the WDM/TDM PON system 200 may reenergize or power up the ONU transmitter and/or receiver for the channel 204. The WDM/TDM PON system 200 may perform the same or similar operations on the OLT side as well.

As mentioned above, the WDM/TDM PON system 200 may be configured to probe or monitor the channels 202-208 to determine whether a channel has become inactive, to determine whether the channel is still inactive, to determine whether the channel has remained inactive for an extended period of time, to detect the presence of an optical signal on the channel, and/or to determine whether an optical signal has been reliably present on the channel for a period of time. In the various embodiments, the WDM/TDM PON system 200 may probe or monitor the channels 202-208 in any of a number of different ways. As an example, the WDM/TDM PON system 200 may use narrow-band spectral power measurements and/or clock recovery techniques to determine whether an optical signal is reliably present on a channel.

As also mentioned above, the WDM/TDM PON system 200 may be configured to compare a timer or time value to a threshold value, and use the results of the comparison to determine whether the channel has been inactive for an extended period of time. The WDM/TDM PON system 200 may use the same or similar techniques and/or threshold values to determine whether an optical signal has been reliably present on the channel (e.g., present on the channel for a suitable amount of time, etc.). As an example, in some embodiments, the WDM/TDM PON system 200 may be configured to use two different threshold values. The first threshold value may identify a duration or period of time in which a channel is to remain inactive before it is classified as having been inactive for an extended period of time. The second threshold value may identify a duration, period of time, or number or ratio of successful signal detections suitable for determining whether an optical signal is reliably present on the channel.

Similar to the example described above, in some embodiments, the WDM/TDM PON system 200 may be configured to use one or more threshold values per channel, with each channel configured independently.

Any or all of the threshold value(s) may be a fixed value, a pre-configured value, or a value that is determined dynamically (e.g., based on configurations, actions, functions, behaviors, conditions, or events that are detected on, present in, or associated with the ONU, the OLT, and/or the channel(s), etc.).

In some embodiments, the WDM/TDM PON system 200 may be configured to implement, support or execute multiple power saving mechanisms, solutions, algorithms, processes or components. For example, the WDM/TDM PON system 200 may execute one or more power saving processes for each channel 202-208. The WDM/TDM PON system 200 may monitor and control each of the channels 202-208 and/or power saving processes independently from the others. Likewise, the channels and processes may operate independent of one another. They may also collaborate, coordinate, and/or communicate with one another via the data link layer. For example, a power saving process may use control channels to communicate directly with another power saving process. Alternatively or in addition, the power saving process may use channel state changes to communicate indirectly with the other power saving process.

Figure 3A:
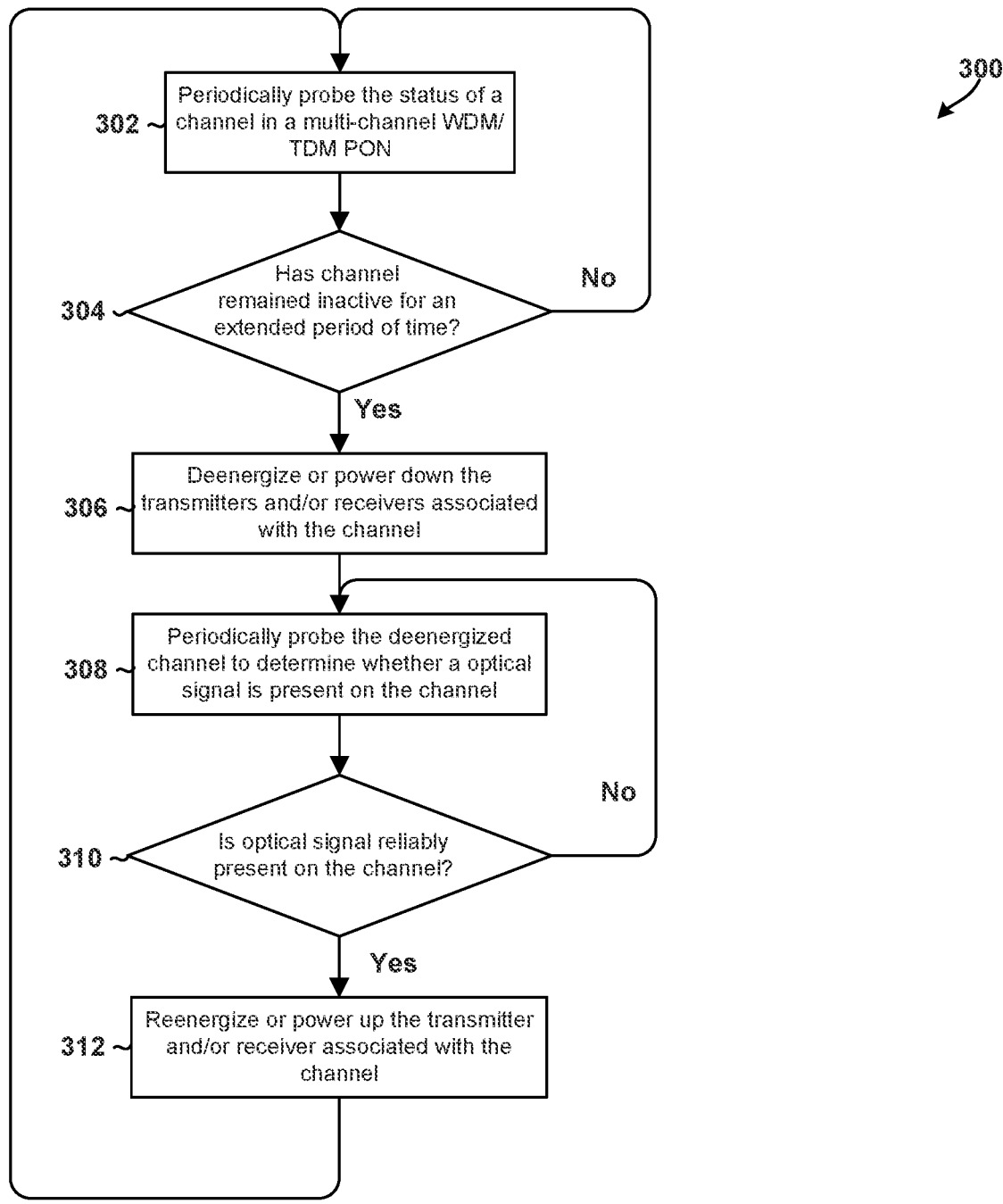
FIGS. 3A-3C are a process flow diagrams illustrating methods of reducing power consumption in a multi-channel PON in accordance with some embodiments.

FIG. 3A illustrates a method 300 of reducing power consumption in a multi-channel WDM/TDM PON in accordance with various embodiments. Method 300 may be performed by one or more processors in a multi-channel WDM/TDM PON. For example, in some embodiments, all or portions of method 300 may be performed by an ONU processor in an ONU device 110 and/or an OLT processor in an OLT device 114.

In block 302, a processor (e.g., ONU processor, OLT processor, etc.) may periodically probe the status of a channel in a multi-channel WDM/TDM PON to determine whether the channel is, or continues to remain, inactive. For example, the processor may monitor the channels to detect activity or inactivity (e.g., determine whether they include a transmission envelope, etc.), set a timer that increments a time value in response to detecting that a channel has become inactive, and periodically probe the status of the channel to determine whether the channel has remained inactive.

The processor may probe or monitor the channels in block 302 in any of a number of different ways, such as by using narrow-band spectral power measurements and/or clock recovery techniques. The processor may determine or select the frequency and duration of the probes based on a fixed, pre-configured, or dynamically determined value (e.g., a periodicity value, etc.). For example, if the periodicity value is 2, the processor may probe the status of a channel every 2 seconds. In some embodiments, the ONU device 110 and OLT device 114 may use different periodicity values to probe the same channel at different frequencies. That is, periodicity of the channel probing on the ONU device 110 and OLT device 114 may be different in some embodiments.

In determination block 304, the processor may determine, based on the probes, whether the channel has remained inactive for an extended period of time. For example, the processor may determine whether the timer or time value exceeds a corresponding threshold value, and determine that the channel has remained inactive for an extended period of time in response to determining that the timer or time value exceeds its corresponding threshold value.

In response to determining that the channel has not been inactive for an extended period of time (i.e., determination block 304="No"), the processor may continue to periodically probe the status of the channel in block 302.

In response to determining that the channel has been inactive for an extended period of time (i.e., determination block 304="Yes"), the processor may deenergize or power down the transmitters and/or receivers associated with the idle channel in block 306.

In block 308, the processor may periodically probe the deactivated channel to determine whether an optical signal is present on the channel.

In determination block 310, the processor may determine whether the optical signal is reliably present on the channel. For example, the processor may determine a ratio between the number of probes within a time period that detected the presence of the signal and the total number of probes within that time period. The processor may compare the ratio of successful signal detections to a threshold value. If the ratio of successful signal detections exceeds the threshold value, the processor may determine that the optical signal has been reliably present on the channel.

In response to determining that the optical signal has not been reliably present on the channel (i.e., determination block 310="No"), the processor may continue to periodically probe the deactivated channel to determine whether an optical signal is present on the channel in block 308.

In response to determining that the optical signal has been reliably present on the channel (i.e., determination block 310="Yes"), the processor may reenergize or power up the transmitter and/or receiver associated with the channel in block 312.

The processor may perform the operations in blocks 302-312 continuously, repeatedly, or periodically for any or all of the channels in the multi-channel WDM/TDM PON. In some embodiments, the processor may perform the operations in blocks 302-312 in a lightweight or background process that does not consume a significant amount of the device's processing, memory or energy resources.

In some embodiments, the PON may be configured to bring back a previously deenergized transmitter and/or receiver associated an idle channel at any time. For example, and ONU device 110 processor may determine to re-enable, reenergize, or power-up a transmitter and/or receiver in response to the detecting a trigger condition. The trigger condition could be any condition that requires increased system capacity, such as a data burst originating from the user. Before fully restoring the transmitter and/or receiver, ONU device 110 could be required to allow sufficient time for the OLT device 114 to perform signal detection and re-enable or reenergize the OLT's receiver and transmitter associated with that channel. The ONU could enable its receiver for that channel after the OLT's receiver and/or transmitter have been reenergized, powered up, or re-enabled.

In some embodiments, the OLT device 114 processor may be configured to perform the same or similar process for a previously deenergized transmitter and/or receiver associated an idle channel. An example trigger condition that could cause OLT device 114 processor to perform such operations is the detection of data that is addressed to a given end subscriber.

Figure 3B:
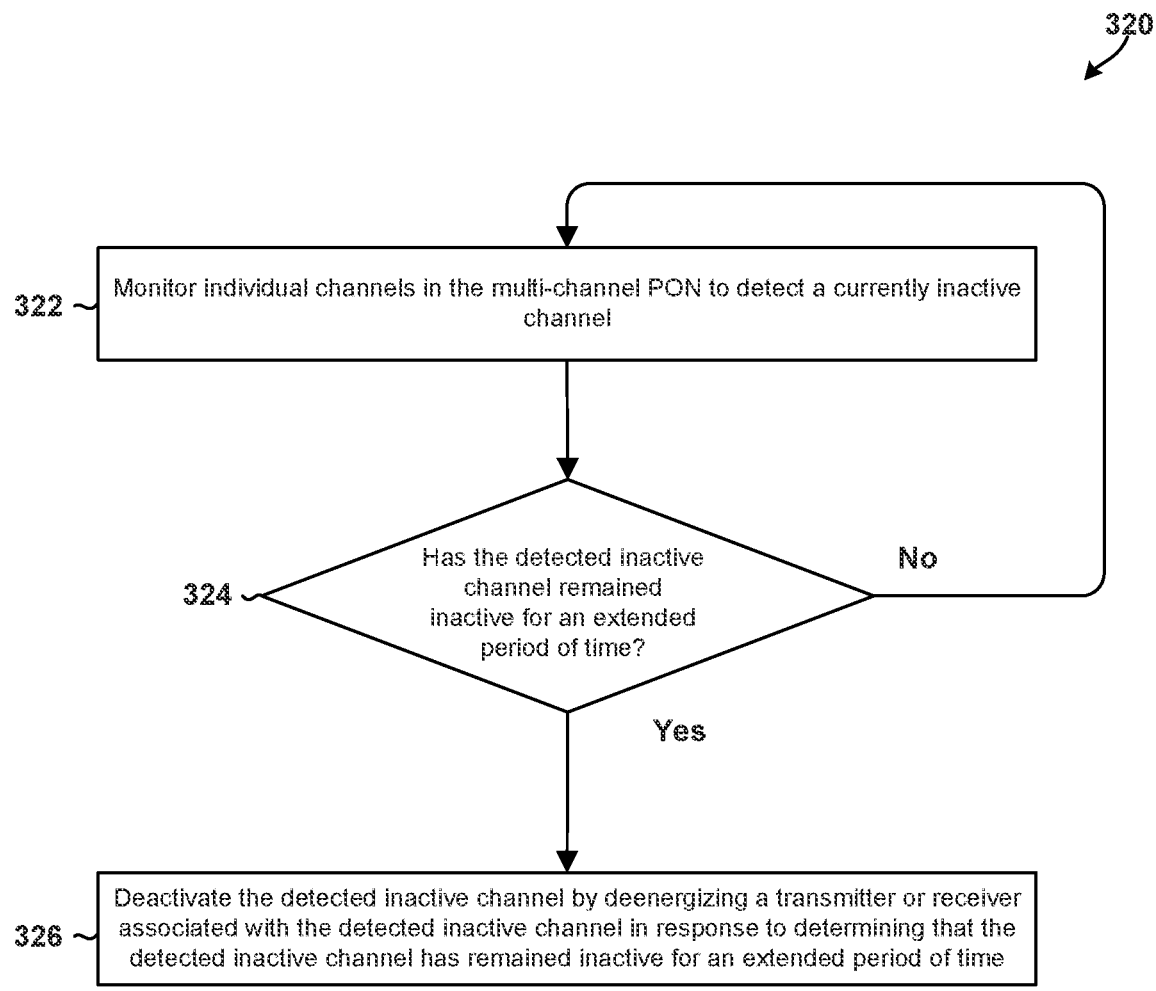

FIG. 3B illustrates a method 320 of reducing power consumption in a multi-channel WDM/TDM PON in accordance with some embodiments. Method 320 may be performed by one or more processors in a multi-channel WDM/TDM PON. For example, in some embodiments, all or portions of method 320 may be performed by an ONU processor in an ONU device 110 and/or an OLT processor in an OLT device 114.

In block 322, the processor may monitor individual channels in the multi-channel PON to detect a currently inactive channel. For example, the processor may use narrow-band spectral power measurements or clock recovery techniques to determine whether the channel is currently inactive. Alternatively or in addition, the processor may determine whether or not the monitored channel includes a transmission envelope.

In determination block 324, the processor may determine whether the detected inactive channel has remained inactive for an extended period of time. For example, the processor may periodically probe a status of the channel to determine whether the channel has remained inactive. Alternatively or in addition, the processor may set a timer that increments a time value in response to detecting the currently inactive channel, continue to monitor the detected channel to determine whether the channel remains inactive, and determine whether the time value exceeds a threshold value. The processor may determine that the channel has remained inactive for an extended period of time in response to determining that the time value exceeds the threshold value.

In response to determining that the detected inactive channel has not remained inactive for an extended period of time (i.e., determination block 324="No"), the processor may continue to monitor individual channels in the multi-channel PON to detect a currently inactive channel in block 322.

In block 326, the processor may deactivate the detected inactive channel by deenergizing a transmitter or receiver associated with the detected inactive channel in response to determining that the detected inactive channel has remained inactive for an extended period of time (i.e., determination block 324="Yes").

Figure 3C:
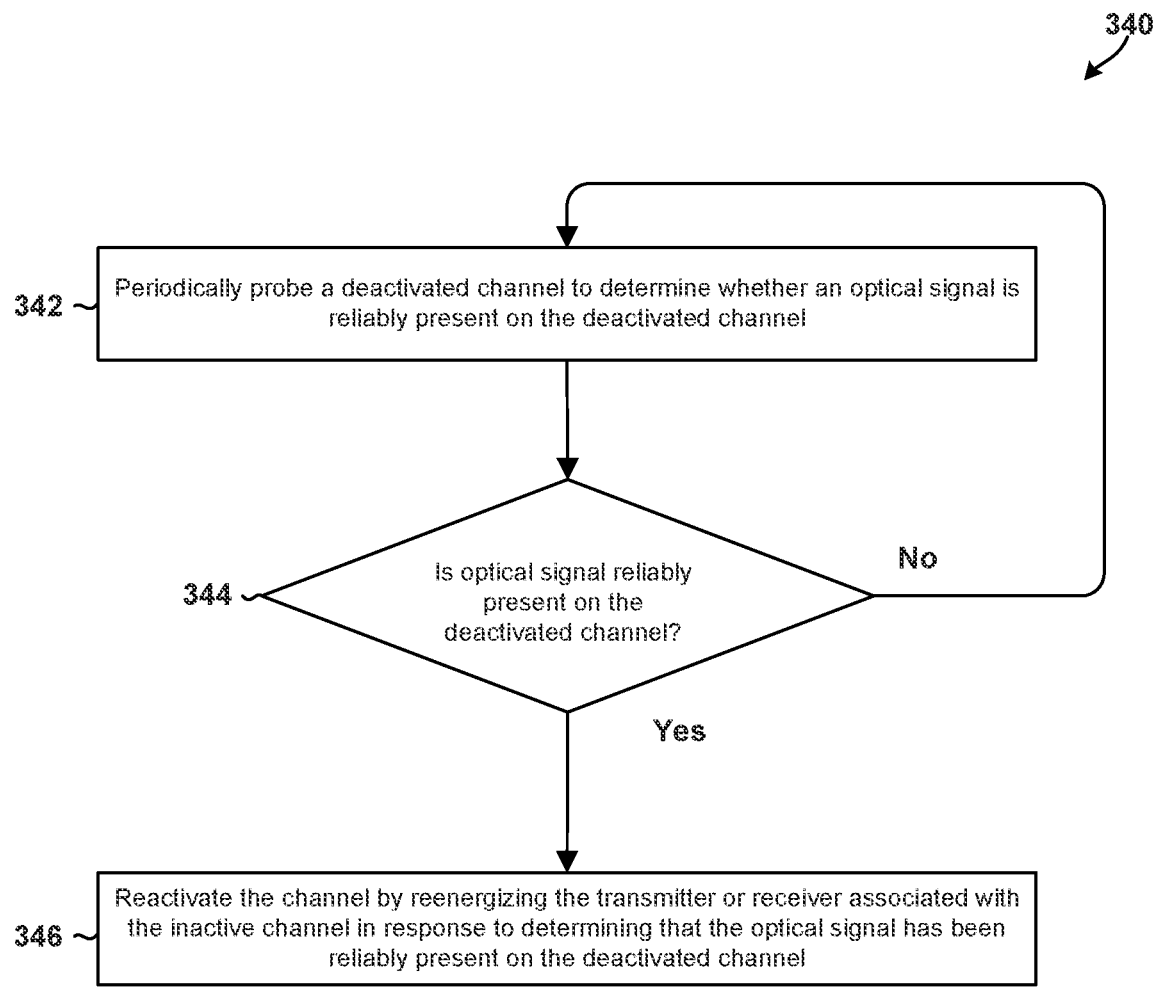

FIG. 3C illustrates a method 340 of reducing power consumption in a multi-channel WDM/TDM PON in accordance with some embodiments. Method 340 may be performed by one or more processors in a multi-channel WDM/TDM PON. For example, in some embodiments, all or portions of method 320 may be performed by an ONU processor in an ONU device 110 and/or an OLT processor in an OLT device 114. In some embodiments, method 340 may be performed after the operations in block 326 of method 320 illustrated in FIG. 3B.

In blocks 342 and 344, the processor may periodically probe the deactivated channel to collect and analyze information suitable for use in determining whether an optical signal is reliably present on the deactivated channel. For example, in blocks 342 and/or 344, the processor may determine a ratio between a number of probes within a time period that detected a presence of the signal and a total number of probes within that time period, determine whether the determined ratio exceeds a threshold value, and determine that the optical signal has been reliably present on the deactivated channel in response to determining that the determined ratio exceeds the threshold value. In response to determining that the optical signal is not reliably present on the deactivated channel (i.e., determination block 344="No"), the processor may continue to periodically probe the deactivated channel in block 342.

In block 346, the processor may reactivate the channel by reenergizing the transmitter or receiver associated with the inactive channel in response to determining that the optical signal has been reliably present on the deactivated channel (i.e., determination block 344="Yes").

In some embodiments, methods 300, 320 and/or 340 may include the processor communicating a power saving state between an OLT of the PON and an ONU of the PON via a previously established control channel. For example, these methods may include communicating a power saving state between the OLT of the PON and the ONU of the PON via an Operations, Administration and Management (OAM) channel or a medium access control (MAC) control channel (MCC). As a further example, the ONU may be configured to use the OAM or MCC to signal the OLT that it can enter a power saving mode.

In some embodiments, methods 300, 320 and/or 340 may include determining, by an OLT of the PON, whether to disable a specific wavelength channel as a central network controller, and communicating a termination decision to all subtended ONUs of the PON via a dedicated wavelength channel management protocol in response to the OLT determining to disable the specific wavelength channel as the central network controller.

Figure 4A:
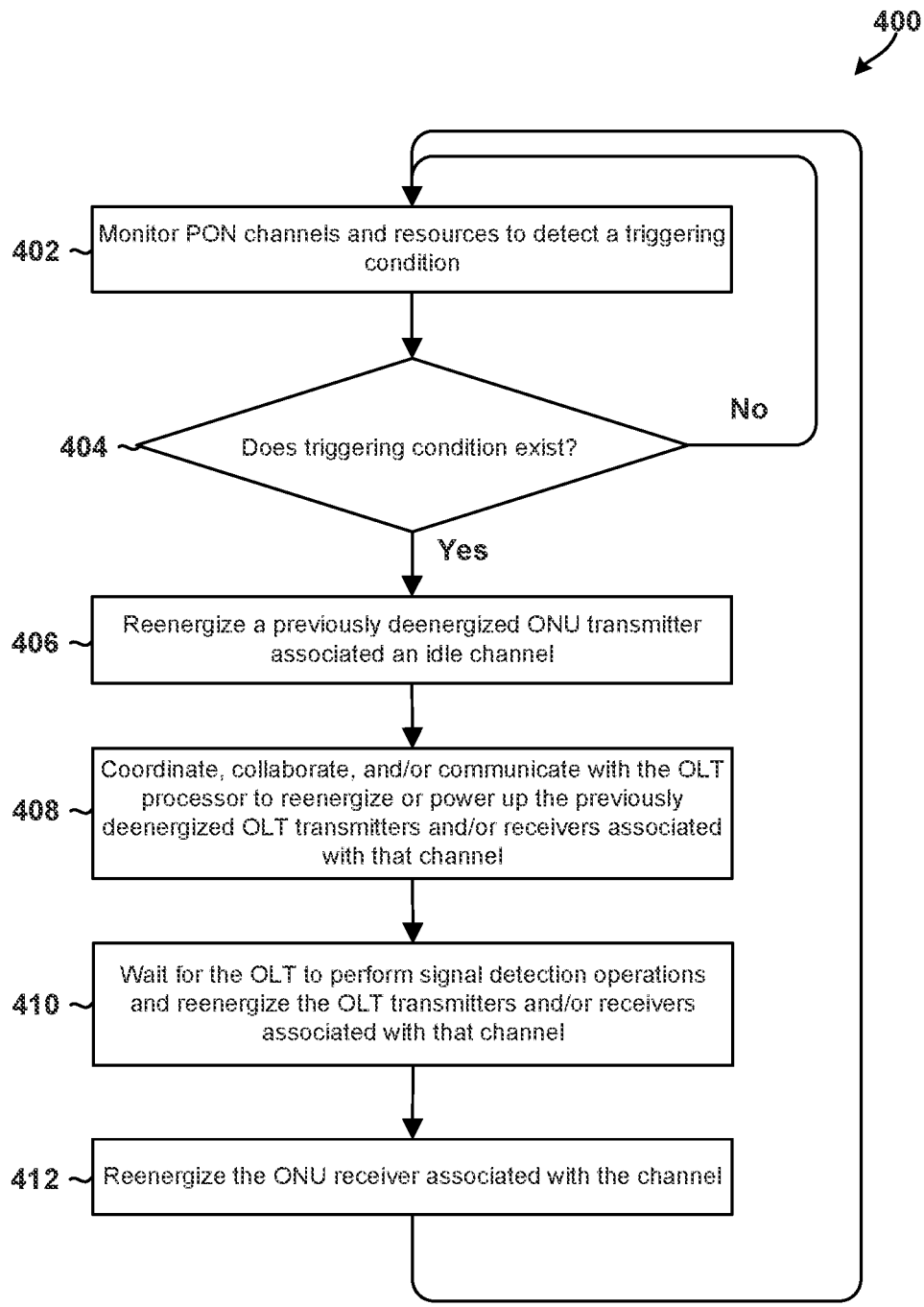
FIGS. 4A and 4B are process flow diagrams illustrating methods of intelligently reactivating a previously deactivated channel in a multi-channel PON in accordance with some embodiments.
Figure 4B:
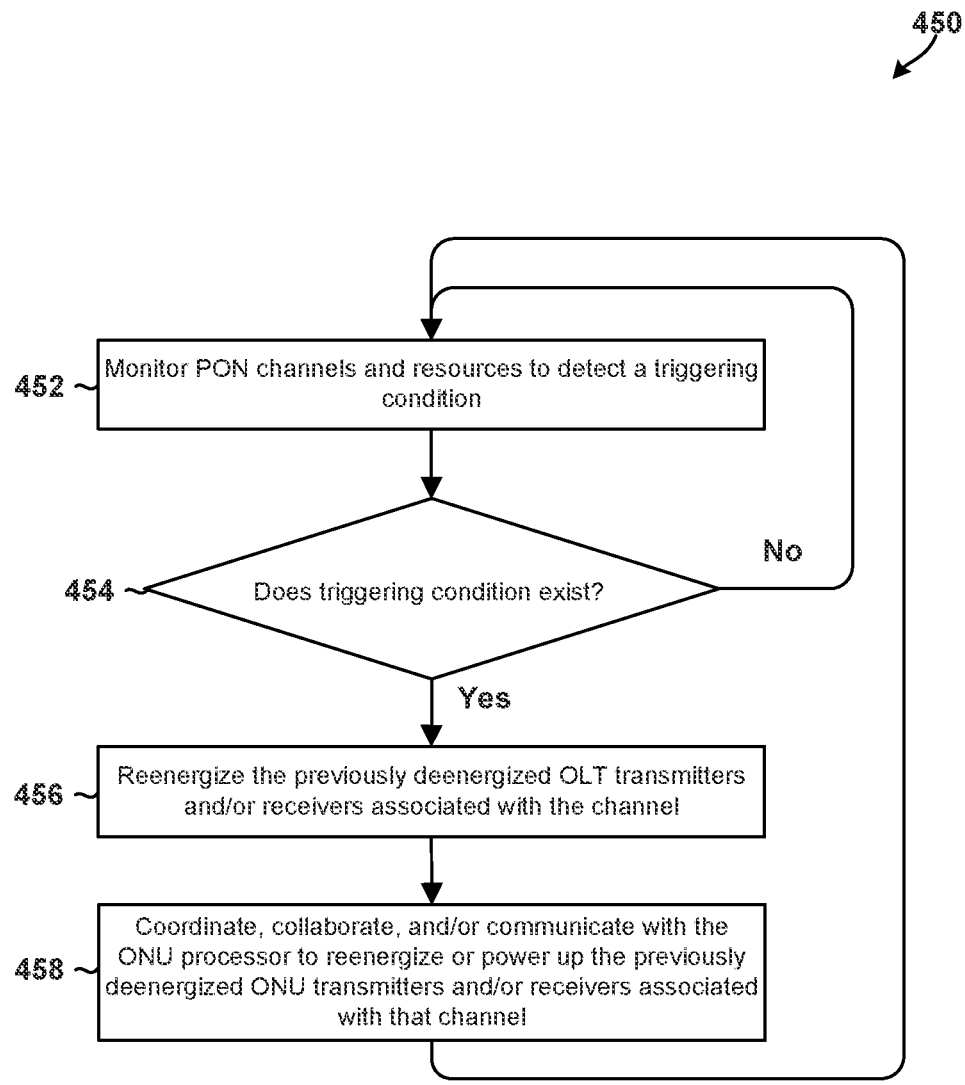

FIGS. 4A and 4B illustrate methods 400, 450 for intelligently reenergizing or powering up a previously deenergized transmitters and/or receivers associated with an idle channel of a multi-channel WDM/TDM PON in accordance with some embodiments. Methods 400, 450 may be performed by one or more processors in a multi-channel WDM/TDM PON. For example, all or portions of method 400 may be performed by an ONU device 110 processor, and all or portion of method 450 may be performed by an OLT device 114 processor.

With reference to FIG. 4A, in block 402, an ONU device 110 processor may monitor PON channels and resources to detect a trigger condition. For example, in block 402, the ONU device 110 processor may monitor the PON for data bursts originating from the user, which could require additional resources or increases in capacity from the PON.

In determination block 404, the ONU device 110 processor may determine, based on the monitoring, whether a triggering condition exists. In response to determining that a triggering condition does not exist (i.e., determination block 404="No"), the ONU device 110 processor may continue to monitor PON channels and resources for trigger conditions in block 402.

In response to determining that a triggering condition does exist (i.e., determination block 404="Yes"), the ONU device 110 processor may perform various operations to reenergize the ONU device 110 transmitter associated with that channel in block 406. For example, the ONU device 110 processor may commence performing the boot up sequence for the ONU device 110 transmitter in block 406.

In block 408, the ONU device 110 processor may coordinate, collaborate, and/or communicate with the OLT device 114 processor to reenergize or power up the previously deenergized OLT device 114 transmitters and/or receivers associated with that channel.

In block 410, the ONU device 110 processor may wait, delay or perform other processing tasks until a sufficient amount of time passes for the OLT device 114 to perform signal detection operations and reenergize the OLT device 114 transmitters and/or receivers associated with that channel.

In block 412, the ONU device 110 processor may perform various operations to reenergize the ONU device 110 receiver associated with that channel.

The ONU device 110 processor may perform the operations in blocks 402-412 continuously, repeatedly, or periodically for any or all of the channels in the multi-channel WDM/TDM PON. In some embodiments, the ONU device 110 processor may perform the operations in blocks 402-412 in a lightweight or background process that does not consume a significant amount of the device's processing, memory or energy resources.

With reference to FIG. 4B, in block 452, an OLT device 114 processor may monitor PON channels and resources to detect a trigger condition. For example, in block 402, the OLT device 114 processor may monitor the PON for data addressed to a specific device or subscriber (e.g., a priority subscriber, etc.), which could require additional resources or increases in capacity from the PON.

In determination block 454, the OLT device 114 processor may determine, based on the monitoring, whether a triggering condition exists. In response to determining that a triggering condition does not exist (i.e., determination block 454="No"), the OLT device 114 processor may continue to monitor PON channels and resources for trigger conditions in block 452.

In response to determining that a triggering condition does exist (i.e., determination block 454="Yes"), in block 456 the OLT device 114 processor may perform various operations to reenergize the previously deenergized OLT transmitters and/or receivers associated with the channel. In block 458, the OLT device 114 processor may coordinate, collaborate, and/or communicate with the ONU processor to reenergize or power up the previously deenergized ONU device 110 transmitters and/or receivers associated with that channel.

Figure 5:
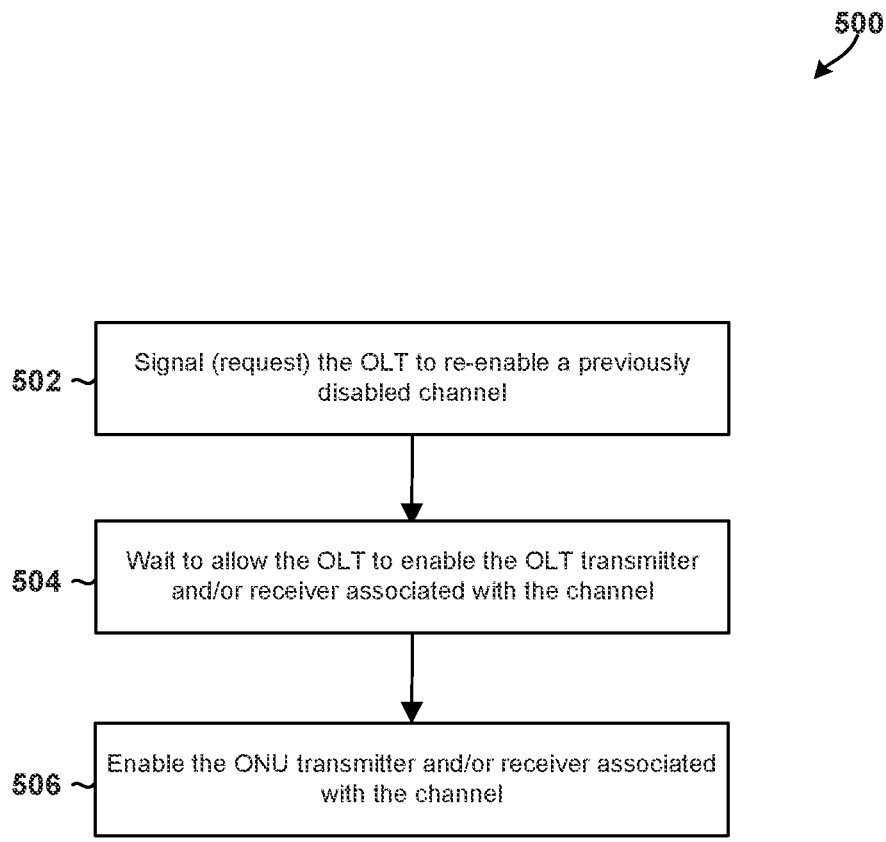
FIG. 5 is a process flow diagram illustrating a method of using signaling to intelligently reactivate a previously deactivated channel in a multi-channel PON in accordance with some embodiments.

FIG. 5 illustrates another method 500 for intelligently reenergizing or powering up previously deenergized transmitters and/or receivers in accordance with some embodiments. Method 500 may be performed by one or more processors in a multi-channel WDM/TDM PON. For example, all or portions of method 500 may be performed by an ONU device 110 processor and/or an OLT device 114 processor. For ease of reference, method 500 is discussed below with reference to an ONU device 110 processor. However, it should be understood that the same or similar operation could be performed by an OLT device 114 processor.

In block 502, the ONU device 110 processor may signal (request) the OLT device 114 to re-enable a previously disabled channel (or to reenergize the previously deenergized OLT device 114 transmitters and/or receivers associated a previously disabled channel). For example, the ONU device 110 may send a pre-defined control message to the OLT device 114 ahead of the time when a transmission channel needs to be up and running again. In block 504, the ONU device 110 processor may wait to allow the OLT device 114 to enable the OLT transmitter and/or receiver for that channel. In block 506, the ONU device 110 processor may enable the ONU transmitter and/or receiver for that channel (i.e., after giving sufficient time for the OLT to enable the OLT transmitter and/or receiver). In some embodiments, the OLT may be configured to perform the same or similar operations discussed above with reference to FIG. 5 to signal (request) the ONU to re-enable a previously disabled channel.

Generally, the ONU device 110 and OLT device 114 maintain at least one of the available wavelength channels enabled. This is to make sure that the communication path between both devices remains open and available for exchange of any required management (control) messages. This channel is designated as the primary channel. The remaining wavelength channels may be subject to standard TDM PON power saving mechanisms, including the operation of any energy-aware scheduling algorithms, but must not be disabled at any time.

The ONU device 110 and OLT device 114 may execute individual processes for each of the wavelength channels available in the system, with the exception of the primary channel. The selection of the primary channel is subject to a default system behavior, where the numerically lowest (channel 0) may be used by the ONU device 110 and the OLT device 114 unless the system is configured otherwise through explicit management configuration or any form of auto-negotiation between OLT and ONU(s).

Under certain circumstances, the ONU device 110 and OLT device 114 may switch to using another wavelength channel as the primary channel. Examples of such circumstances may include failure of the laser driver on the OLT device 114, impeding failure of the OLT device 114 receiver for the given channel, or failure of the receiver/transmitter on the current primary channel on one of the ONUs. The switch to using another wavelength channel may effectively isolate an ONU device 110 from the OLT device 114 (e.g., when all other non-primary channels are put into power saving mode and disabled).

When the ONU is first registered in the PON, the ONU may commence using the default primary channel, which may be requested to be changed into another channel through an explicit configuration by the OLT. Alternatively, the ONU may request the change to another channel when and if the local transmitter and/or receiver for the current primary channel indicate imminent failure.

As mentioned above, some components (e.g., power saving process, etc.) may use control channels to communicate directly with other components. In some embodiments, the OLT and/or ONU may be configured communicate their power saving states via a control channel that is already established between these devices. For example, in some embodiments, an EPON ONU may be configured to send and/or receive power saving state information to and from the OLT via the Operations, Administration and Management (OAM) channel or a medium access control (MAC) control channel (MCC).

In some embodiments, ONU may be configured to use the OAM or MCC to signal the OLT that it can enter power saving mode (e.g., because the ONU does not detect any activity on LAN, etc.). In response to receiving the signaling message from the ONU, the OLT may perform validation operations and/or check to determine whether it has any data for the ONU. If not, the OLT may confirm that the ONU is allowed to go to power saving mode for a specific period of time. When the period of time expires, the ONU may wake up, refresh its state, and check to determine whether the user activity has changed. If the user activity has changed, the ONU may update its operating state based on the detected changes in user activity. On the other hand, in response to determining that the user activity has not changed, the ONU may enter into another sleep cycle using the same permission-based model.

The decision to use OAM or MCC is determined based on the target response speed from the ONU. The OAM channel is a slower, but more extensible protocol, typically implemented in software and allowing for more flexible vendor-specific extensions. The MCC is typically a much faster protocol, implemented in ASIC, and providing little extensibility without hardware changes.

The ONU may be configured to selectively ask for power savings on selected channels only, depending on the network activity on the LAN side. For example, an ONU that sees only a few Mbps of customer traffic, and does not need to use all 50 Gbps of capacity, may disable one of the wavelength channels (Tx/Rx). The decision to disable a specific wavelength channel is taken by the OLT as the central network controller and communicated to all subtended ONUs via a dedicated wavelength channel management protocol. In the case of EPON, such a decision would be communicated via the Channel Control Protocol (CCP).

In the case of multi-channel systems, the sleep cycle may be implemented only on one of the target channels, where the subtended ONUs operating on this channel are allowed to enter the sleep mode as required and/or controlled by the OLT. The remaining wavelength channels are shut down completely to conserve power at the discretion of the OLT. For example, in the case of a 4 wavelength PON system, with a low data demand, channel number 3 is selected as the channel to operate in sleep mode, while channels 0, 1, and 2 are shut down to conserve power. With higher data demand, channel number 3 is selected as the channel to operate in sleep mode, channel 2 is selected to operate in the always-on mode (no sleep mode allowed), and channels 0 and 1 are shut down to conserve power. The decision which channels are shut down to conserve power and which remain operation depends on the current data load, and/or management configuration by the network operator, and/or OLT implementation and its capabilities.

There are no advantages to allow for sleep mode operation on all wavelength channels. The increased sleep cycle overhead eliminates any power saving advantages, complicates the internal ONU and/or OLT design, and requires more complex control protocols. By operating only a single channel in the sleep mode (fine control), while operating the remaining channels in the on/off mode (coarse control), the optimum power savings may be achieved.

The ONU may be configured to selectively perform a Tx or TRx sleep mode, whereby in the Tx mode only the upstream channel transmitter is disabled in the sleep mode, and in the TRx mode both the upstream channel transmitter and the downstream receiver are disabled. The decision to enter the Tx or TRx sleep mode may be changed from cycle to cycle dynamically, depending on the specific traffic conditions observed by the ONU. For example, when a period of user inactivity is observed, the ONU may enter the Tx mode, not transmitting any data towards the OLT, but receiving any downstream transmissions. Otherwise, the ONU may enter the TRx sleep mode. The Tx and/or TRx mode selection may be also further restricted through management configuration, whereby the network operator may disable the ability of the ONU to enter the specific sleep mode.

Figure 6:
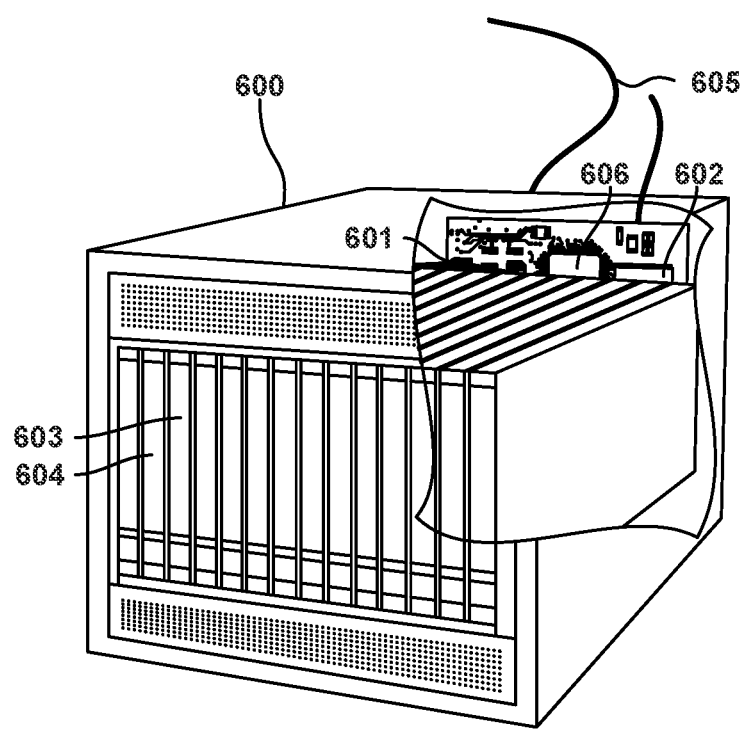
FIG. 6 is an illustration of an example computing system that suitable for implementing some embodiments.

All or portions of the methods or component discussed in this application may be implemented in a computing system that implements a computing architecture similar to any of a variety of commercially available server devices, such as the server 600 illustrated in FIG. 6. Such a server 600 typically includes a processor 606 coupled to volatile memory 602 and a large capacity nonvolatile memory, such as a disk drive 603. The server 600 may also include a disc drive 601 coupled to the processor 606. The server 600 may also include network access ports 604 coupled to the processor 606 for establishing data connections with a network 605, such as a local area network coupled to other broadcast system computers and servers.

The processors discussed in this application may be any programmable microprocessor, microcomputer or multiple processor chip or chips that can be configured by software instructions (applications) to perform a variety of functions, including the functions of the various aspects described below. In some mobile devices, multiple processors may be provided, such as one processor dedicated to wireless communication functions and one processor dedicated to running other applications. Typically, software applications may be stored in the internal memory 602 before they are accessed and loaded into the processor 601. The processor 601 may include internal memory sufficient to store the application software instructions.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The functions described for various embodiments may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A method of reducing power consumption in a multi-channel passive optical network (PON), comprising:
    detecting a currently inactive channel based on a result of monitoring individual channels in the multi-channel PON;
    determining whether the detected inactive channel has remained inactive for an extended period of time;
    deactivating the detected inactive channel by deenergizing a transmitter associated with the detected inactive channel in response to determining that the detected inactive channel has remained inactive for an extended period of time;
    periodically probing the deactivated channel to determine whether an optical signal is reliably present on the deactivated channel by:
        determining a ratio between a number of probes within a time period that detected a presence of the signal and a total number of probes within that time period; and
        determining whether the determined ratio exceeds a threshold value; and
    reactivating the channel by reenergizing the transmitter associated with the inactive channel in response to determining that the optical signal has been reliably present on the deactivated channel.

2. The method of claim 1, wherein periodically probing the deactivated channel to determine whether the optical signal is reliably present on the deactivated channel further comprises:
    determining that the optical signal has been reliably present on the deactivated channel in response to determining that the determined ratio exceeds the threshold value.

3. The method of claim 1, wherein monitoring channels in the multi-channel PON to detect the currently inactive channel comprises determining whether the channel is currently inactive based on a result of a narrow-band spectral power measurement or clock recovery technique.

4. The method of claim 1, wherein monitoring channels in the multi-channel PON to detect the currently inactive channel comprises determining whether the channel includes a transmission envelope.

5. The method of claim 1, wherein determining whether the channel has remained inactive for an extended period of time comprises:
    setting a timer that increments a time value in response to detecting the currently inactive channel; and
    continuing to monitor the detected channel to determine whether the channel remains inactive,
    determining whether the time value exceeds a threshold value; and
    determining that the channel has remained inactive for an extended period of time in response to determining that the time value exceeds the threshold value.

6. The method of claim 1, wherein determining whether the channel has remained inactive for an extended period of time comprises periodically probing a status of the channel to determine whether the channel has remained inactive.

7. The method of claim 1, further comprising communicating a power saving state between an optical line terminal (OLT) of the PON and an optical network unit (ONU) of the PON via a previously established control channel.

8. The method of claim 7, wherein communicating the power saving state between the OLT of the PON and the ONU of the PON via the previously established control channel comprises communicating the power saving state between the OLT of the PON and the ONU of the PON via an Operations, Administration and Management (OAM) channel or a medium access control (MAC) control channel (MCC).

9. The method of claim 8, wherein communicating the power saving state between the OLT of the PON and the ONU of the PON via the OAM or MCC further comprises the ONU using the OAM or MCC to signal the OLT that it can enter a power saving mode.

10. The method of claim 1, further comprising:
determining, by an optical line terminal (OLT) of the PON, whether to disable a specific wavelength channel; and
communicating a termination decision to optical network unit (ONUs) of the PON via a dedicated wavelength channel management protocol in response to the OLT determining to disable the specific wavelength channel.

11. A computing device, comprising:
a processor configured with processor-executable software instructions to:
detect a currently inactive channel based on a result of monitoring individual channels in a multi-channel passive optical network (PON);
determine whether the detected inactive channel has remained inactive for an extended period of time;
deactivate the detected inactive channel by deenergizing a transmitter associated with the detected inactive channel in response to determining that the detected inactive channel has remained inactive for an extended period of time;
periodically probe the deactivated channel to determine whether an optical signal is reliably present on the deactivated channel by:
determining a ratio between a number of probes within a time period that detected a presence of the signal and a total number of probes within that time period; and
determining whether the determined ratio exceeds a threshold value; and
reactivate the channel by reenergizing the transmitter associated with the inactive channel in response to determining that the optical signal has been reliably present on the deactivated channel.

12. The computing device of claim 11, wherein the processor is further configured to periodically probe the deactivated channel to determine whether the optical signal is reliably present on the deactivated channel by:
determining that the optical signal has been reliably present on the deactivated channel in response to determining that the determined ratio exceeds the threshold value.

13. The computing device of claim 11, wherein the processor is configured to monitor channels in the multi-channel PON to detect the currently inactive channel by determining whether the channel is currently inactive based on a result of a narrow-band spectral power measurement or clock recovery technique.

14. The computing device of claim 11, wherein the processor is configured to monitor channels in the multi-channel PON to detect the currently inactive channel by determining whether the channel includes a transmission envelope.

15. The computing device of claim 11, wherein the processor is configured to determine whether the channel has remained inactive for an extended period of time by:
setting a timer that increments a time value in response to detecting the currently inactive channel; and
continuing to monitor the detected channel to determine whether the channel remains inactive,
determining whether the time value exceeds a threshold value; and
determining that the channel has remained inactive for an extended period of time in response to determining that the time value exceeds the threshold value.

16. The computing device of claim 11, wherein the processor is configured to determine whether the channel has remained inactive for an extended period of time by periodically probing a status of the channel to determine whether the channel has remained inactive.

17. The computing device of claim 11, wherein the processor is further configured to communicate a power saving state between an optical line terminal (OLT) of the PON and an optical network unit (ONU) of the PON via a previously established control channel.

18. The computing device of claim 17, wherein the processor is configured to communicate the power saving state between the OLT of the PON and the ONU of the PON via the previously established control channel by communicating the power saving state between the OLT of the PON and the ONU of the PON via an Operations, Administration and Management (OAM) channel or a medium access control (MAC) control channel (MCC).

19. The computing device of claim 18, wherein the processor is configured to communicate the power saving state between the OLT of the PON and the ONU of the PON via the OAM or MCC by the ONU using the OAM or MCC to signal the OLT that it can enter a power saving mode.

20. The computing device of claim 11, wherein the processor is further configured to:
determine, in an optical line terminal (OLT) of the PON, whether to disable a specific wavelength channel; and
communicate a termination decision to optical network unit (ONUs) of the PON via a dedicated wavelength channel management protocol in response to the OLT determining to disable the specific wavelength channel.

21. A non-transitory computer readable storage medium having stored thereon processor-executable software instructions configured to cause a processor in a computing system to perform operations for reducing power consumption in a multi-channel passive optical network (PON), the operations comprising:
detecting a currently inactive channel based on a result of monitoring individual channels in the multi-channel PON;
determining whether the detected inactive channel has remained inactive for an extended period of time;
deactivating the detected inactive channel by deenergizing a transmitter associated with the detected inactive channel in response to determining that the detected inactive channel has remained inactive for an extended period of time;
periodically probing the deactivated channel to determine whether an optical signal is reliably present on the deactivated channel by:

determining a ratio between a number of probes within a time period that detected a presence of the signal and a total number of probes within that time period; and determining whether the determined ratio exceeds a threshold value; and reactivating the channel by reenergizing the transmitter associated with the inactive channel in response to determining that the optical signal has been reliably present on the deactivated channel.

22. The non-transitory computer readable storage medium of claim 21, wherein the stored processor-executable software instructions are configured to cause the processor to perform operations such that periodically probing the deactivated channel to determine whether the optical signal is reliably present on the deactivated channel further comprises:

determining that the optical signal has been reliably present on the deactivated channel in response to determining that the determined ratio exceeds the threshold value.

23. The non-transitory computer readable storage medium of claim 21, wherein the stored processor-executable software instructions are configured to cause the processor to perform operations such that monitoring channels in the multi-channel PON to detect the currently inactive channel comprises determining whether the channel is currently inactive based on a result of a narrow-band spectral power measurement or clock recovery technique.

24. The non-transitory computer readable storage medium of claim 21, wherein the stored processor-executable software instructions are configured to cause the processor to perform operations such that monitoring channels in the multi-channel PON to detect the currently inactive channel comprises determining whether the channel includes a transmission envelope.

25. The non-transitory computer readable storage medium of claim 21, wherein the stored processor-executable software instructions are configured to cause the processor to perform operations such that determining whether the channel has remained inactive for an extended period of time comprises:

setting a timer that increments a time value in response to detecting the currently inactive channel; and continuing to monitor the detected channel to determine whether the channel remains inactive, determining whether the time value exceeds a threshold value; and determining that the channel has remained inactive for an extended period of time in response to determining that the time value exceeds the threshold value.

26. The non-transitory computer readable storage medium of claim 21, wherein the stored processor-executable software instructions are configured to cause the processor to perform operations such that determining whether the channel has remained inactive for an extended period of time comprises: periodically probing a status of the channel to determine whether the channel has remained inactive.

27. The non-transitory computer readable storage medium of claim 21, wherein the stored processor-executable software instructions are configured to cause the processor to perform operations further comprising:

communicating a power saving state between an optical line terminal (OLT) of the PON and an optical network unit (ONU) of the PON via a previously established control channel.

28. The non-transitory computer readable storage medium of claim 27, wherein the stored processor-executable software instructions are configured to cause the processor to perform operations such that communicating the power saving state between the OLT of the PON and the ONU of the PON via the previously established control channel comprises communicating the power saving state between the OLT of the PON and the ONU of the PON via an Operations, Administration and Management (OAM) channel or a medium access control (MAC) control channel (MCC).

29. The non-transitory computer readable storage medium of claim 28, wherein the stored processor-executable software instructions are configured to cause the processor to perform operations such that communicating the power saving state between the OLT of the PON and the ONU of the PON via the OAM or MCC further comprises the ONU using the OAM or MCC to signal the OLT that it can enter a power saving mode.

30. The non-transitory computer readable storage medium of claim 21, wherein the stored processor-executable software instructions are configured to cause the processor to perform operations further comprising:

determining, by an optical line terminal (OLT) of the PON, whether to disable a specific wavelength channel; and communicating a termination decision to optical network unit (ONUs) of the PON via a dedicated wavelength channel management protocol in response to the OLT determining to disable the specific wavelength channel.

* * * * *